United States Patent [19]
El-Ammouri et al.

[11] Patent Number: 6,077,439
[45] Date of Patent: Jun. 20, 2000

[54] METHOD FOR THE REMOVAL OF METALS FROM SOLUTION BY MEANS OF ACTIVATED SILICA

[75] Inventors: Elias Gebran El-Ammouri, Montreal; Philip Andrew Distin, Hudson; Barbara Mary-Ann Lempka, Mississauga; Rodger Graham Hagens, Hamilton, all of Canada

[73] Assignee: McGill University, Montreal, Canada

[21] Appl. No.: 08/916,417

[22] Filed: Aug. 22, 1997

Related U.S. Application Data

[60] Provisional application No. 60/024,498, Aug. 23, 1996.
[51] Int. Cl.[7] ................................. C02F 1/28; C02F 1/64
[52] U.S. Cl. ......................... 210/665; 210/670; 210/688; 210/912
[58] Field of Search ..................................... 210/665, 670, 210/684, 688, 711, 716, 912, 681

[56] References Cited

U.S. PATENT DOCUMENTS 3,963,640  6/1976  Smith ........................................ 210/716
4,396,585  8/1983  Rosene ...................................... 210/684

*Primary Examiner*—Ivars Cintins
*Attorney, Agent, or Firm*—Ridout & Maybee

[57] ABSTRACT

The surprising ability of the polysilicate microgels commonly known as "activated silica" to adsorb and to release heavy metals selectively as a function of pH is used in a novel method for separating metals from dilute aqueous solution by means of selective precipitation with and recovery from an activated silica absorbent, selected changes to the pH. The process is particularly intended for the economic purification of contaminated waste streams to recover valuable but toxic heavy metals from such effluents at a lower cost than hitherto possible, using an activated silica substrate which may be regenerated by alkali treatment.

4 Claims, No Drawings

METHOD FOR THE REMOVAL OF METALS FROM SOLUTION BY MEANS OF ACTIVATED SILICA

RELATED APPLICATION

This application replaces U.S. Provisional Patent Application No. 60/024,498, from which it derives the benefit of a filing date of Aug. 23, 1996.

FIELD OF THE INVENTION

This invention relates generally to the use of activated silica to remove metal ions from aqueous solution by precipitation, to the subsequent recovery of the metal ions in concentrated form from the precipitate by acidification, and to the separation of dissolved metals by means of precipitation with activated silica solution followed by selective recovery of metal ions from the precipitate at different pH conditions. In particular, the invention relates to a method for recovering heavy metals from industrial waste streams, such as the aqueous run-off from mining operations.

BACKGROUND OF THE INVENTION

The contamination of the environment with aqueous solutions of heavy metals from industrial waste stream remains a serious problem. In spite of significant advances in the treatment of such effluent in recent years, no completely satisfactory method for the removal of such toxins from industrial effluent yet exists. One area of particular concern is the aqueous run-off from mining operations, including so called "acid mine drainage." The effluent from mining operations frequently contains a complex mixture of heavy metals such as copper, nickel, lead, zinc, etc. at concentrations well above the acceptable regulatory limits, but too low to be economically recovered by conventional processes. These streams which are usually at a low pH, also contain large quantities of other, less toxic metals such as iron and calcium.

Currently, the method most widely used to remove toxic metals from effluent streams involves raising the pH of the solutions to the level at which the metal hydroxides are least soluble, usually between 9 and 11, so that they can be removed by precipitation. The best technology hitherto in use employs hydrated lime as an alkali source, with precipitation of the metal hydroxides in large clarifiers facilitated by additional sedimentation aids such as ferric sulfate and organic polymers. This treatment results in the recovery of large quantities of a voluminous sludge consisting of a mixture of the metal hydroxides admixed with calcium sulfate (gypsum). Since the metals are unrecoverable from this gypsum matrix, the sludge is then transferred to a landfill site, or returned to the tailings pile from which the metals had originally emanated. This procedure is undesirable for a number of reasons. For one, the steadily rising costs of landfill make the disposal of toxic sludge ever more expensive. The second problem is that the metals are not permanently removed from the environment. This is because the chemical environment within the landfill itself is usually unstable, and subject to a steady decline in pH. As this occurs the metal hydroxides re-dissolve and re-enter the environment, requiring yet another treatment. Since mine tailings and landfill sites are likely to remain in place for many centuries, such an ongoing cycle is clearly unacceptable.

Another factor contributing to the desirability of extracting the heavy metals from the effluent is the fact that in their pure form the metals are of considerable economic value. Not unexpectedly, much attention has been given in recent years to methods which might allow the recovery of the dissolved metals from solution. Some techniques which have been taught to achieve this end include the use of membrane filtration, or electrochemical methods [L. L. Tavlarides et al. Separation Sci & Technology 22: 2–3 (1987)] These methods, however, suffer the disadvantage of high operational cost, and are inadequate for the large volumes of liquid commonly encountered in mine effluent streams. Another method which has enjoyed some success in the removal (but not recovery) of the toxic metals involves insolubilization of the gypsum sludge by the formation of a cementitious matrix, the so-called "Chemfix" process. (R. B. Pojesek Chem Eng. 86, Aug. 13, 1979; P. G. Lawrence Chem-fix Inc. Report 1980, Pittsburgh, Pa.). This method has not however received widespread application since the treatment is not only expensive, but the long term validity remains unproven. The use of soluble alkali silicates for the removal of heavy metals from solution is described by J. S Falcone (ACS Symposium Ser. 194 Am. Chem Soc. New York, 1982), but this too results in the formation of a complex precipitate from which the metals cannot be economically extracted.

Various chemical methods to recover metals from waste streams by ion exchange have been described. Thus zeolite (M. J. Zamzow et al. Sep. Sci. Technology 25: 13–15 (1990) 1555–69), quartz (T. W. Healy et al. Adv. Chem. Ser 79 (1968) 62) and alumina (M. Uberoi and F. Shadman Prep. Pap. Am. Chem Soc. Div Fuel Chem 4 (1991) 36) have all been recommended for this purpose. Although each of these methods offers the promise of recovering the metals from solution, they all require relatively high concentrations of metals in solution to be effective. The German Patent disclosure DE 42 44 258 A1 (Jun. 23, 1994; Grace GmbH) on the other hand teaches that silica gel can be used to concentrate cadmium in solution from quite dilute solutions, but this method is relatively slow, and suffers from a number of other disadvantages for which silica gel is well known.

The ability of silica gel to remove metals from solution by selective adsorption has been extensively described, and the adsorption and desorption of a wide range of metals under different pH conditions has been studied by D. L. Dugger et al. (J. Phys. Chem. 68 (1964) 757060), R. O. James and T. W. Healy (J. Coll. Interface Sci. 40 (1972) 65–81), V. F. and J. Galba Coll (Czech Commun. 32 (1967) 3, 530–6), and P. W. Schindler et al. (J. Coll Interface Sci. 55 (1976) 469–75). A theoretical discussion of the adsorption of dissolved metals by silica is also to be found in R. K. Iler ("The Chemistry of Silica," New York: John Wiley & Sons, 1979). One of the problems of using silica gel as an ion exchange medium, however, is that being a weak acid, the pH of the solution from which the metals are removed declines as the metals are adsorbed onto the silica gel. This has the consequence that as the process proceeds desorption begins to occur. Even if the pH were to be artificially controlled in order to effect selective adsorption of metals from solution (as would be obvious to those skilled in the art), another problem arises due to the fact that silica gel is physically quite fragile and expensive. The handling of the product which is required to facilitate the process can frequently lead to destruction of the gel, at considerable financial cost.

Various recent disclosures have sought to avoid some of these drawbacks by adsorbing various organic and inorganic ion exchange materials onto either alumina or silica gel, which such cases are treated as an inert substrate. Thus the German patent disclosure DE 3823957 A1 (Jan. 18, 1990, R.

Ballhorn) teaches that heavy metals can be removed from solution by means of calcium phosphate adsorbed onto silica gel. Similarly Schlapfer (C. W. Schlapfer, U.S. Pat. No. 5,102,640 Apr. 7, 1992) describes a process for the removal of metal ions from solution by means of dipicolylamine bound to a silica gel surface while G. Giraudi et al. (Annali di Chemica 74 (1984) 307–13) present a method of concentrating metal ions using pyridylazo naphthol adsorbed on silica gel. A summary of some other complex forming reagents supported on silica gel which have been tried for this purpose was published K. Terada (analytical Sciences 7 (1991) 187–98). Such methods, although valuable for analytical purposes are, however, inadequate for use with industrial waste and process streams. The coated silica gel materials described in these articles are both too expensive and fragile for the numerous cycles required to allow this method to compete with alternate treatments such as lime.

SUMMARY OF THE INVENTION

In our investigation of the properties of the modified alkali silicates commonly described as "activated silica" (or, alternatively, "polysilicate microgels"), we discovered that these materials exhibit a surprising ability to adsorb and subsequently release heavy metals in a way which affords advantages for the chemical recovery of metals from waste streams over the prior art chemical systems described above.

Activated silica is a well-known material which may be described as a highly dispersed polymeric form of silica produced when dilute aqueous solutions of alkali metal silicates are reacted with mineral acids, or with multivalant metal ions such as calcium, iron or aluminum. Descriptions of the chemistry and method of preparation of activated silica are well covered in the literature. The chemistry is to be found in Iler (1979, p. 231), J. G. Vail ("Soluble Silicates," Vol II New York: Reinhold, 1960), K. R. Lange and R. W. Spenser (Envir. Sci. and Technology 2: 3 (1968) 212–6), and T. Hasekawa et al. (Water Science and Technology 23 (1991) 1713)–1722). The manufacture of this material is described by C. Henry (J. Am. Water Works Ass. 30:1 (1958) 61–71), and is disclosed in U.S. Pat. No. 3,963,640 (Jun. 15, 1976 to Anglian Water Authority, U.K. and No. 4,147,657 (to the PQ Corporation).

Activated silica may be manufactured and stored using specialized equipment, or can be prepared in situ, by reacting soluble silicate with acids or polyvalent cations in the presence of the medium to be treated by the activated silica. The material has been used for almost sixty years in the commercial purification of drinking water and has found application in the flocculation of alumina and silver bromide sols and also as a retention/drainage aid in papermaking.

However, we found no description of any special ability of activated silica to remove metals from solution by comparison with silica gel, alumina or other substrates, so were surprised in the course of our experimentation to find activated silica to be not only far more effective than lime, alkali silicate or silica gel in the removal of metal ions from solution, but also to afford a route to regenerating the metals in concentrated form with high efficiency. We have also found that the process of metal removal by activated silica can be extended to allow re-use of the activated silica itself and to selectively discriminate between different metal ions.

According to a first aspect of the present invention there is provided a method for removing metal ions from solution by treatment with an aqueous solution of activated silica.

According to a further aspect of the invention, there is provided a method for recovering in concentrated form the metal ions precipitated with activated silica, by acidulation of the precipitate.

According to a further aspect of the invention, there is provided a method for re-use of activated silica which has been used to precipitate metal ions as aforesaid.

According to a further aspect of the invention, there is provided a method of separating metals by means of selective precipitation and recovery as aforesaid, carried out at different pH conditions.

It is a particular object of the present invention to provide a process for using activated silica to purify contaminated waste streams and recover heavy metals from such effluents at a lower cost and with higher efficiency than by using silica gel as an ion exchange medium.

DESCRIPTION OF THE PREFERRED EMBODIMENTS (i) Efficient Removal of Dissolved Metals from Aqueous Solution by Means of Activated Silica The ability of activated silica prepared in situ, by the reaction of sodium silicate and calcium hydroxide, to remove dissolved metals from solution much more efficiently than can be achieved by the use of either of these individual reagents alone is illustrated in Example 1 and Table I below.

The reaction between the activated silica and the metal ions results in the formation of a precipitate which rapidly settles to the bottom of the reaction vessel, leaving a supernatant having a very low metal content. This might not itself afford commercial metals recovery value, as the metals contained in the precipitated sludge remain admixed with calcium in a manner similar to the result when calcium hydroxide alone is used as the precipitant. However, enhanced commercial viability of the process according to the present invention is illustrated in Examples 2, 3 and 4 below, showing the precipitated metal (copper or iron) may be readily dissolved by the simple expedient of reducing the pH of the complex from its initial value of about 8–9 to about 5.

It was seen that acidification of the precipitate leads to the immediate formation of two distinct layers, one consisting of a concentrated solution of metal ions, and the second a finely dispersed suspension of silica. Now in concentrated form, the metals are easily separated from the particulate silica by conventional mechanical means such as filtration or centrifugation.

EXAMPLE 1

Efficient Removal of Dissolved Metals from Aqueous Solution by Means of Activated Silica A stock solution containing nickel, lead, copper and zinc was prepared by addition of analytical grade nitrate salts of these metals to deionized water. The amounts added were calculated to yield the concentrations shown in Table I. Separate 100 ml samples taken from the stock solution were mixed with either: (1) sodium silicate (in which the weight ratio of silica to soda was 2.0), or (2) slaked lime ($Ca(OH)_2$), or (3) an equimolar mixture of (1) and (2). The quantity of reagent added was that required to achieve the pH range shown in Table I. The reacted samples were left to stand for 10 days, with no further treatment except for periodic testing of the pH. The samples were then filtered (42 analytical grade filter paper), and the filtrate analyzed for metals by Inductively Coupled Plasma Emission Spectroscopy. All metal concentrations shown in the Table are expressed in parts per million. Those given at pH 5.5 are to be taken as control.

The results illustrated in Table I reveal that the application of sodium silicate is superior to lime in the reduction of the concentration of heavy metals, but that the combination of the two, i.e., the in situ formation of activated silica is much superior to both. Note in particular that low metal concentrations are observed even when the alkalinity of the solutions exceeds pH 9–10, a condition when the metal concentration typically rises due to increased solubility of metal hydroxides.

complexes, the activated silica will tend to disperse, leading to silica losses into the product solution and/or effluent if recycled.

EXAMPLE 3

Recovery of Metal Ions (Iron) in Concentrated Form

An aqueous solution containing 558 ppm iron (ferric) at pH 2.45 was prepared from analytical grade ferric sulphate.

TABLE I

Note: "Si" designates, addition of sodium silicate alone, (1) above; "Ca" is addition of line alone, (2) above; and "Si + Ca" is the combination of the two (3).

| pH | ← Nickel → | | | ← Lead → | | | ← Copper → | | | ← Zinc → | | |
| --- | --- | --- | --- | --- | --- | --- | --- | --- | --- | --- | --- | --- |
|     | Si | Ca | Si + Ca | Si | Ca | Si + Ca | Si | Ca | Si + Ca | Si | Ca | Si + Ca |
| 5.5 | 56.90 | 56.90 |       | 46.80 | 46.80 |       |       | 54.50 | 54.50 |       | 52.50 | 52.50 |
| 6   | 53.00 | 56.60 |       | 23.70 | 42.30 |       | 2.45  | 47.10 |       | 44.60 | 44.60 |       |
| 7   | 35.80 | 52.80 | 32.10 | 0.13  | 0.93  | 0.83  | 0.13  | 0.82  | 0.10  | 7.90  | 45.00 | 3.34  |
| 7.5 | 11.20 | 39.70 |       | 0.01  | 0.51  |       | 0.03  | 0.48  |       | 1.35  | 22.60 |       |
| 8   |       | 10.20 | 15.30 |       | 0.12  | 0.07  |       | 0.15  | 0.05  |       | 3.29  | 1.42  |
| 8.5 | 6.93  | 5.85  | 0.12  | 2.89  | 0.10  | 0.02  | 2.46  | 0.07  | 0.05  | 3.91  | 1.48  | 0.05  |
| 9   |       | 6.44  | 0.062 |       | 0.53  | 0.01  |       | 0.07  | 0.02  |       | 2.04  | 0.04  |
| 10  | 56.70 |       | 0.04  | 48.60 |       | 0.02  | 53.50 |       | 0.02  | 52.00 |       | 0.04  |
| 11  | 39.70 |       |       | 27.50 |       |       | 29.20 |       |       | 33.80 |       |       |

EXAMPLE 2

Recovery of Metal Ions (Copper) in Concentrated Form

A stock solution of activated silica was prepared from a sodium silicate solution containing 8.90 weight % soda and 28.7 weight % silica. After 50 volume % dilution with water, gelation was initiated by adding, with stirring, 10 weight % sulphuric acid solution to give 2.04 weight %silica solution at pH 8.20. Gelation was arrested by dilution with 50 volume % water after half the total gel time of 18 minutes had elapsed. This stabilized sol was the source of activated silica used in Examples 2–7.

An aqueous solution containing 63.5 ppm copper and 11 ppm iron (ferric) at pH 5.50 was prepared from analytical grade copper and ferric sulphates. A 15 mL sample of activated silica, prepared as described above, was added incrementally to 100 mL of copper/iron solution, with stirring, followed by addition of a few drops of sodium hydroxide solution to reach a final pH of 7.05. The system was held for 15 minutes to allow formation of metal-hydroxy complexes which adsorbed onto the activated silica to form a green opaque layer that settled beneath clear residual solution.

After centrifuging to promote rejection of water from the metal-containing activated silica layer, the residual solution, containing 1.6 ppm copper, was discarded. The pH of the activated silica layer was adjusted to 4.36 using 1.0 weight % sulphuric acid solution. After a contact time of 20 minutes, the system was centrifuged again, giving an essentially iron-free aqueous phase containing 355 ppm copper. The activated silica layer is now brown, indicating that iron remains adsorbed.

It should be noted that, although it is possible to concentrate copper in the above manner, but from an iron-free feed solution, the stability of the activated silica layer is enhanced by the presence of iron-hydroxy complexes during and after copper desorption. If copper is re-dissolved as described above, but leaving activated silica totally devoid of hydroxy A 20 mL sample of activated silica, prepared as described in Example 2, was added incrementally to 100 mL of iron solution, with stirring, followed by addition of 2.9 mL of 28.0 g/L slaked lime solution to reach a final pH of 4.00 after 24 hours retention.

After centrifuging, the residual solution (effluent) containing 1.9 ppm iron, was discarded. The pH of the activated silica layer was adjusted to 0.77 using a few drops of concentrated (93.1 weight %) sulphuric acid. After a contact time of 20 minutes, the system was centrifuged again, giving a clear brown aqueous phase occupying about 75% of the total volume and containing 8.00 g/L iron (product solution). An opaque, white lower layer of activated silica was retained, which occupied about 25% of the total volume and was essentially iron-free. The iron distribution after the adsorption/desorption cycle is 99.6% into the product solution, 0.4% into the effluent and 0.0% retained by the activated silica. Although essentially complete iron recovery at a concentration factor of 14.3 (i.e. 558 ppm Fe feed, 8.00 g/L product) is achieved, an iron-free activated silica layer at pH 0.77 has been created which tends to disperse so increasing silica losses into the product solution and/or effluent. Silica losses into the effluent after adsorption and into the iron solution after desorption were 4.1% and 9.0% of the initial activated silica addition respectively.

EXAMPLE 4

Recovery of Metal Ions (Iron) in Concentrated Form

An aqueous solution containing 11.1 g/L iron (ferric) at pH 1.45 was prepared from analytical grade ferric sulphate. A 40 mL sample of activated silica, prepared as described in Example 2, was added incrementally to 100 mL of iron solution, with stirring, followed by addition of 56.0 mL of 28.0 g/L slaked lime solution to reach a final pH of 2.82 after 24 hours retention.

After centrifuging, the residual solution (effluent) containing 97 ppm iron, was discarded. The pH of the activated silica layer was adjusted to 1.35 using 1.0 mL concentrated (93.1 weight %) sulphuric acid. After a contact time of 1 hour, the system was centrifuged again giving a clear, dark brown aqueous phase occupying about 75% of the total volume containing 39.3 g/L iron (product solution). An opaque, light brown, lower layer of activated silica was present, which occupied about 25% of the total volume, and contained 120 ppm iron. The iron distribution after the adsorption/desorption cycle was 84.6% into the product solution, 14.0% retained by the activated silica, 1.4% into the effluent.

(iii) Regeneration of Activated Silica following Recovery of Precipitated Metal Ions The recovery of metal ions according to the process of the present invention is rendered still more economical by the capability which activated silica affords for regeneration and re-use in subsequent metal precipitation/separations. This regeneration can be accomplished by the simple expedient of raising the pH of the residual silica obtained after the dissolved metals have been physically removed. This can be achieved by the addition of one or more sources of alkali, as illustrated in Example 5.

EXAMPLE 5

Re-use and Recycling of Activated Silica (Copper Recovery)

An aqueous solution containing 63.5 ppm copper and 11 ppm iron (ferric) at pH 3.43 was prepared from analytical grade copper and ferric sulphates for use in two consecutive adsorption/desorption cycles. In the first cycle, 22.5 mL of activated silica, prepared as described in Example 2, was added incrementally to 100 mL of copper/iron solution, with stirring, to reach a final pH of 7.07 after 15 minutes retention.

After centrifuging, the residual solution contained 2.3 ppm copper, which represents a loss of 3.5% of the feed copper. After discarding the residual solution, the pH of the activated silica layer was adjusted to 4.13 with 1.0 weight % sulphuric acid solution. After a contact time of 20 minutes, the system was centrifuged again, giving a clear aqueous phase containing 245 ppm copper, 28 ppm iron. An opaque, light-brown lower layer of activated silica containing adsorbed iron was present, which was then used in a second cycle.

In the second cycle, the recycled activated silica layer was added incrementally to 100 mL of copper/iron solution, with stirring, and a few drops of sodium hydroxide solution were required to reach a final pH of 7.05 after 15 minutes retention. After centrifuging, the residual solution contained 1.9 ppm copper, which represents a loss of 3.2% of the feed copper. After discarding the residual solution, the pH of the activated silica layer was adjusted to 4.15 with 1.0 weight % sulphuric acid solution. After a contact time of 20 minutes, the system was centrifuged again, giving a clear aqueous phase containing 420 ppm copper, 17 ppm iron. A brown lower layer of activated silica was generated, as seen at the end of the first cycle.

It is understood that if only copper is being recovered from a copper/iron solution using multiple recycles of activated silica, there will be a progressive build-up of adsorbed iron, which would eventually have to be removed by desorption at pH 1–2.

(iv) Separation of Metals by Means of Selective Precipitation and Recovery

The full potential for the use of activated silica in the purification of acidic waste streams becomes evident in the aspect of this discovery illustrated in Examples 6 and 7 below, relating to the use of activated silica in separating metals having different adsorption profiles with respect to activated silica. This is effected by selective pH control, in a manner analogous to that in which conventional ion exchange materials have been employed.

Because the microstructure of activated silica is not dissimilar to that of silica gel itself, one would anticipate the pH dependence of the reaction between dissolved metals and activated silica to be similar, although not identical to the case of silica gel. In keeping with the references cited above (Dugger 1964; James & Healy 1972; Schindler 1976) it might be expected that ferric and aluminum cations would react with activated silica at a relatively low pH, while a number of common heavy metals would be expected to adsorb onto activated silica at a somewhat higher pH, perhaps between pH 6 and 8. Calcium and magnesium might be expected to be removed from solution only at pH in excess of 8.5.

As shown in the following examples, activated silica was found in fact to be capable of separating two metals of widely differing adsorption profiles, the method being demonstrated with ferric and cupric ions in Example 6 and with nickel and magnesium ions in Example 7. Evidently, effective separation of iron, aluminum, calcium and magnesium from the heavy metals by selective adsorption, would present a very valuable feature in the recovery of these metals.

Conceptually, the removal and recovery of metals from a waste source containing a complex mixture of metals and acid according to an embodiment of the present invention can be described in the following steps, each readily achievable by engineers skilled in the art of chemical processing:

(1) Reaction 1: To the waste material being treated, which might typically be acidic with a pH between about 2 and 5, and contained in a reactor, add sufficient activated silica (pH 8–9) to complex all the ferric and aluminum ions present. Experience has shown that maximum adsorption is achieved when the ratio of silica ($S_iO_2$) to metal ion is about 10:1. In this step care should be taken that the final pH of the reactants not exceed about 6. This treatment will result in the rapid settling of a precipitate containing silica and adsorbed ferric and aluminum ions, with the other heavy metals being retained in the supernatant.

(2) The ferric/aluminum/silica precipitate is then separated from the supernatant by one of the well known methods used for this process (e.g. filtration or centrifugation). The supernatant (now containing the heavy metals) is removed for the next treatment stage.

(3) Reaction 2: The precipitate obtained from Reaction 1 is then treated with mineral acid to below pH 2 in order to release the adsorbed metals [the method described in Examples 2 and 3]. The concentrated solution containing ferric and aluminum ions is recovered for sale, or further processing, while the silica recovered is transferred to another reactor.

(4) The regenerated activated silica is then available for re-use. Optionally, an alkali source, preferably, but not limited to sodium hydroxide, is then added to the silica in the second reactor so that the pH is increased to between 10 and 12.

(5) The supernatant obtained from Reaction 1, is then reacted with an alkali source, preferably but not limited to lime, to raise the pH to 7–8, after which sufficient activated silica is added to adsorb the heavy metals, care being taken that the final pH of the reaction not exceed about 8.5.

(6) As before, the two layers which form are isolated from each other, and the supernatant layer (now containing only sodium, calcium, magnesium and sulfate ions at pH 8–9, can be discharged as effluent.

(7) The lower layer is then treated with mineral acid to reduce the pH to below about 5, at which stage the mixture of heavy metals (e.g. Cu, Ni, Fb, Zn) are released in the form of their soluble salts. One of a number of mineral acids can be used to effect this low pH. Typically the acid of choice will be one of (though not limited to) sulfuric, hydrochloric or nitric acids, the one chosen will depend on such factors as the composition of the heavy metals, availability, etc.

(8) The next step involves separation of the dissolved metals from the silica, which now appears in the form of dispersed particulate silica, by centrifugation or settling. The supernatant solution containing the heavy metals now in concentrated form can be sent either to recovery, via a process such as electrorefining, or if the concentration is still considered too low, it can be returned to the beginning of the process for further upgrading.

(9) Optionally, the dispersed silica is treated with an alkali metal hydroxide or carbonate in order to raise the pH to 10–11, at which time it is regenerated in the form of activated silica and available for re-use.

Turning now to specific experimental examples of metals removal and recovery according to the present invention:

EXAMPLE 6

Metals Separation (Copper/Iron) by Selective Precipitation

An aqueous solution containing 63.5 ppm copper and 55.8 ppm iron (ferric) at pH 3.09 was prepared from analytical grade sulphate salts. After addition, with stirring, of 5 mL of 0.84 g/L slaked lime solution to 100 mL of copper/iron solution, activated silica, prepared as described in Example 2, was added in amounts as needed to reach the pH values shown in Table II. The activated silica formed a distinctively coloured lowered layer containing hydroxy complexes of iron (brown), copper (blue) or copper and iron (green), while the upper layer of residual solution was essentially colourless.

After 12 hours retention, the system was centrifuged, and residual solution was analyzed for copper and iron contents, as shown in Table II. Optimum separation is at about pH 5, at which at least 90% of the iron has been adsorbed onto the activated silica, while most of the copper remains dissolved.

TABLE II

Copper/Iron (Ferric) Separation Using Activated Silica

| pH | ppm Fe | ppm Cu |
| --- | --- | --- |
| 3.09 | 55.8 | 63.5 |
| 4.23 | 17.5 | 57.0 |
| 5.20 | 2.4 | 48.5 |
| 6.20 | 0 | 20.0 |
| 7.03 | 0 | 2.15 |

EXAMPLE 7

Metals Separation (Nickel/Magnesium) by Selective Precipitation

An aqueous solution containing 3.0 g/L nickel and 10.0 g/L magnesium at pH 3.30 was prepared from analytical grade sulphate salts. After addition, with stirring, of 20 ml of activated silica, prepared as described in Example 2, 28.0 g/L slaked lime solution was added in amounts as needed to reach the pH values shown in Table 2. The activated silica formed a distinctively coloured lower layer containing hydroxy complexes of nickel (green) or nickel (green) and magnesium (white), while the upper layer of residual solution was colourless when nickel-free. After 1 day retention, the system was centrifuged, and residual solution was analyzed for nickel and magnesium contents, as shown in Table III. Optimum separation is at about pH 8.2, at which about 95% of the nickel has been adsorbed onto the activated silica, while 83% of the magnesium is retained by the residual solution.

TABLE III

Nickel/Magnesium Separation Using Activated Silica

| pH | ppm Ni | g/L Mg |
| --- | --- | --- |
| 3.30 | 3,000 | 10.0 |
| 7.17 | 2,775 | 9.14 |
| 7.59 | 1,942 | 8.71 |
| 7.98 | 494 | 8.57 |
| 8.22 | 155 | 8.29 |
| 8.50 | 4.9 | 7.50 |
| 9.55 | 0.9 | 6.39 |
| 10.1 | 0.3 | 2.29 |

The use of activated silica to purify contaminated waste streams and recover heavy metals from such effluents therefore has a number of novel advantages:

(1) Low cost: Activated silica is readily prepared by treating low cost commercial alkali (most commonly sodium) silicate, with common mineral acids.

(2) Ease of handling: Because both the activated silica and its complex with metal ions remain in the form of a pumpable slurry, the loss of silicas by particle destruction, a serious drawback in the case silica gel is eliminated.

(3) Efficiency: The loss of material due to the friable nature of silica gel is avoided.

(4) Recyclability: The economics are improved by the fact that nearly all the silica can be recycled, and only small amounts of fresh alkali silicate are required to compensate for process losses.

(5) pH control: The drop in efficiency due to pH decline which occurs when silica gel is used as an ion exchange medium is eliminated.

The invention therefore offers of a superior method of the treatment of waste water streams containing toxic metals which is both efficient and cost effective. In this method and reaction of activated silica with dissolved metals can be effectively clean the effluent and concentrate the heavy metals in a form in which they are readily recoverable.

We claim:

1. A method for the selective separation of metal ions from a dilute aqueous solution of a mixture of at least two kinds of metal characterized by differing pH-dependent adsorption affinities for complexing with activated silica, comprising the steps of:

(a) adding to said dilute aqueous solution sufficient activated silica and raising the pH of the solution to a first value, at which substantially all of a first kind of metal ion present complexes selectively with the activated silica to form a first precipitate therewith, the remaining kinds of metal from said dilute aqueous solution remaining in a first supernatant liquid layer;

(b) physically separating said first precipitate from said first supernatant liquid layer;

(c) treating said first precipitate with mineral acid to lower the pH sufficiently to effect desorption of said first kind of metal into a supernatant layer of concentrated solution, then physically separating a concentrated solution of said first kind of metal from the activated silica;

(d) treating the separated first supernatant liquid layer from step (b) with sufficient alkali to raise the pH to a second value and with sufficient activated silica, such that substantially all of a second kind of metal ion preferentially complexes with the activated silica and forms a second precipitate therewith, any other kinds of metal ion originally present in said dilute aqueous solution of at least two kinds of metal ion remaining in a second supernatant liquid layer; and (e) physically separating said second precipitate from said second supernatant liquid layer and treating the second precipitate with mineral acid to lower the pH sufficiently to effect desorption of said second kind of metal into a concentrated solution thereof.

2. A method according to claim 1, wherein the activated silica used in step (d) to complex with said second kind of metal is activated silica separated in step (c) from said concentrated solution of the first kind of metal and then regenerated.

3. A method according to claim 1, wherein the dilute aqueous solution of metal ions comprises ferric and aluminum ions as said first kind of metal ion, heavy metals as the second kind of metal ion and alkali and alkaline earth metals as a third kind of metal and wherein:

(a) the pH is lowered in step (c) to below about 2, thereby to release the adsorbed first kind of metal into said mineral acid to produce a concentrated solution of ferric and aluminum ions; and (b) in step (d), sufficient alkali is added to produce a second pH value of about 7 to 8, effecting the formation of a second precipitate containing said heavy metals and a second supernatant liquid layer containing said alkali and alkaline earth metals.

4. A method according to claim 3, comprising the further step of treating said second precipitate after its separation from said second supernatant liquid layer with mineral acid to reduce the pH to below about 5 and effect the desorption and release of said heavy metals as soluble salts in solution.

* * * * *